(12) United States Patent
Chaudhri et al.

(10) Patent No.: US 7,665,038 B1
(45) Date of Patent: *Feb. 16, 2010

(54) METHOD AND APPARATUS FOR CONTROLLING A DISPLAY OF A DATA PROCESS SYSTEM

(75) Inventors: Imran Chaudhri, San Francisco, CA (US); Bas Ording, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 336 days.

This patent is subject to a terminal disclaimer.

(21) Appl. No.: 11/643,315

(22) Filed: Dec. 20, 2006

Related U.S. Application Data

(63) Continuation of application No. 10/101,302, filed on Mar. 18, 2002, now Pat. No. 7,444,599.

(60) Provisional application No. 60/364,995, filed on Mar. 14, 2002.

(51) Int. Cl.
*G06F 3/00* (2006.01)

(52) U.S. Cl. .................. 715/830; 715/815; 715/828

(58) Field of Classification Search .............. 715/830, 715/833, 828, 786, 783, 815
See application file for complete search history.

(56) References Cited

U.S. PATENT DOCUMENTS

| | | | |
|---|---|---|---|
| 5,533,180 A | | 7/1996 | Zhou et al. |
| 5,572,647 A | | 11/1996 | Blades |
| 5,721,847 A | | 2/1998 | Johnson |
| 5,883,623 A | | 3/1999 | Cseri |
| 6,147,674 A | * | 11/2000 | Rosenberg et al. .......... 345/157 |
| 6,232,972 B1 | | 5/2001 | Arcuri et al. |
| 6,300,967 B1 | | 10/2001 | Wagner et al. |
| 6,317,739 B1 | | 11/2001 | Hirata et al. |
| 6,448,985 B1 | | 9/2002 | McNally |
| 6,734,882 B1 | * | 5/2004 | Becker ....................... 715/815 |
| 6,785,676 B2 | | 8/2004 | Oblinger |
| 7,080,324 B1 | * | 7/2006 | Nelson et al. ............... 715/771 |
| 2002/0149619 A1 | | 10/2002 | Sauer |

OTHER PUBLICATIONS

Screen Dumps, (2 sheets), Internet Explorer, Version: 5.0, software released in 1999.
Microsoft Corporation, Microsoft Internet Explorer, 2001, version 6.0.2800.1106Co.

* cited by examiner

*Primary Examiner*—Dennis Bonshock
(74) *Attorney, Agent, or Firm*—Blakely, Sokololoff, Taylor & Zafman LLP

(57) ABSTRACT

Method and apparatus for controlling a display of a data processing system. According to one embodiment of the invention, a method of controlling a display of a data processing system includes: displaying a first list as a scrollable view of items in a first mode; receiving an input to switch from the first mode to a second mode; and displaying, in the second mode, a representation of a command which when activated causes a display of a second list of the items. The first list is displayed within a window and the representation is displayed within the window. According to another embodiment of the invention, a method of controlling a display of a data processing system includes: displaying, in a first mode, a slider control having a slider which can be positioned in one of a plurality of positions to select a corresponding one of a plurality of parameters; receiving an input to switch from the first mode to a second mode; and displaying, in the second mode, a representation of a command which when activated causes a display of a list of items corresponding to at least a subset of the plurality of parameters.

42 Claims, 12 Drawing Sheets

METHOD AND APPARATUS FOR CONTROLLING A DISPLAY OF A DATA PROCESS SYSTEM

This application is a continuation of U.S. patent application Ser. No. 10/101,302, filed on Mar. 18, 2002 now U.S. Pat. No. 7,444,599. This application also claims the benefit of the filing date of Provisional Application No. 60/364,995, filed Mar. 14, 2002, and entitled "Method and Apparatus for Controlling a Display of a Data Processing System" by inventors Imran Chaudhri and Bas Ording.

FIELD OF THE INVENTION

The invention relates to digital processing systems, and more particularly to Graphical User Interfaces (GUI).

BACKGROUND OF THE INVENTION

A typical Graphical User Interface (GUI) includes a number of GUI components (e.g., icons, labels, push buttons, radio buttons, checkboxes, combination boxes or combo boxes, pop-up menus, pop-down menus, menu bars, tool bars, text entries, text areas, canvas panels, sliders, and others) contained within a window. A user may want to reduce the size of the window to make room for other windows, or enlarge the window to have a large area for displaying detailed information in the window. When the window containing these GUI components is resized, the layout of the GUI components within the window is typically changed in order to accommodate the new size of the window.

FIGS. 2-4 show a prior art method of rearranging buttons when the window containing the buttons is resized. In FIG. 2, window 200 contains buttons 211-216 and canvas panels 203 and 205 for displaying information. Canvas panel 203 contains information that cannot be entirely fit into panel 203. Thus, a scroll control 201 is provided for a user to view different portions of the information displayed in canvas panel 203.

A user may drag an edge of the window to resize it. For example, a user may drag near point 201, where the cursor changes its shape to indicate dragging is causing the window to change its width. When the size of the window is reduced, the buttons are rearranged. In FIG. 3, the width of the window is reduced when compared to that in FIG. 2. Since the sizes of the buttons 211-216 are fixed, only buttons 211-214 can be displayed above canvas panels 203 and 205. Thus, buttons 215-216 are hidden. Icon 305 is displayed to indicate that some of the buttons are hidden, which can be accessed by selecting it (positioning a cursor over icon 305 and pressing a button such as a mouse's button). The widths of canvas panels 205 and 203 are resized so that canvas panels 205 and 203 can be displayed within the window. When the width of canvas 303 is not large enough to display the information in it, a scroll bar 303 is provided for navigation purposes.

The user may further adjust the width by dragging near point 301. When the window is reduced to a width as shown in FIG. 4, only buttons 211-213 are visible above canvas 203. Canvas 205 is hidden, since there is not enough space for it. Canvas 205 is displayed only when the window has a large enough space for it. When the user presses icon 405 with cursor 403 (e.g., pressing a button of a mouse when the cursor 403 is located above icon 405), a menu 401 is shown in a separate window, displaying buttons 411, 413, and 415. Buttons 411-415, corresponding to buttons 214-216, are normally hidden when the window is resized to a width as shown in FIG. 4. When icon 405 is pressed, buttons 411-415 are displayed so that the user may press one of them.

Thus, when a window containing a number of GUI components is resized, the layout of GUI components within the window is typically changed to accommodate the size of the window.

SUMMARY OF THE INVENTION

Methods and apparatuses for controlling a display of a data processing system are described here.

According to one exemplary embodiment of the invention, a method of controlling a display of a data processing system includes: displaying a first list as a scrollable view of items in a first mode; receiving an input to switch from the first mode to a second mode; and displaying, in the second mode, a representation of a command which when activated causes a display of a second list of the items. The first list is displayed within a window and the representation is displayed within the window. The window may include buttons for closing the window, minimizing the window and maximizing the window. The window may contain a plurality of scrollable views in the first mode. The scrollable view of the items may be a scrollable list view of the items. The scrollable list view contains at least one of: a) scroll arrows; and b) scroll bar for scrolling the first list in one example. In another example according to this aspect, the representation of the command is a button; and the first and second lists have the same content. In another example according to this aspect, the input includes dragging a portion of the window which contains the scrollable view; and the window shrinks to a minimal predetermined size independently of a drag length when the drag length causes the window to reach a predetermined size. In another example according to this aspect, the input is clicking a button. The second list is displayed within a movable window. The second list may be also scrollable.

According to another embodiment of the invention, a method of controlling a display of a data processing system includes: displaying, in a first mode, a slider control having a slider which can be positioned in one of a plurality of positions to select a corresponding one of a plurality of parameters; receiving an input to switch from the first mode to a second mode; and displaying, in the second mode, a representation of a command which when activated causes a display of a list of items corresponding to at least a subset of the plurality of parameters. In one example according to this aspect, the representation of the command is a button. The content of the plurality of positions matches corresponding ones of the items. The input may be determined from dragging a portion of a window containing the slider. In another example according to this aspect, the input is determined from clicking a button. The slider control is displayed within a movable window; and the representation is displayed within the movable window in the second mode.

According to a further embodiment of the invention, a method to display a control in a graphical user interface includes: determining whether the control is in a first mode or in a second mode, the control having first information and second information, the first information identifying the control, the second information describing the control; displaying the control as a first type of user interface in a first window showing both the first information and the second information, when the control is in the first mode; displaying the control as a second type of user interface in the first window showing the first information and not showing the second information, when the control is in the second mode; and displaying the second information in a second window in response to receiving input to the control when the control is in the second mode. In one example according to this aspect, the second information describes optional states for the control; a layout of the second information in the second window is substantially the same as a layout of the second information in the first window. To display the second information the first type of user interface uses one of: a) a selection list; b) a checkbox set; c) a radio button group; d) a slider; e) a text area; and f) a canvas. The second window is one of: a) a popup window; b) a pulldown window; and c) a dialog window. The second type of user interface is displayed in a smaller area in the first window than the first type of user interface; and the control is in the second mode when an area allocated for the control is smaller than a critical size.

According to a further embodiment of the invention, a method to display a graphical user interface (GUI) includes: determining whether a first window is in a first mode or in a second mode; when the first window is in the first mode: displaying detailed information of a first GUI component of the first window in a first scrollable area of the first GUI component in the first window; when the first window is in the second mode: displaying the first GUI component without showing the detailed information in the first window; and displaying the detailed information in a second window in response to receiving input which requires the detailed information be displayed. In one example of the according to this aspect, first input is received to resize the first window; and whether the first window is in the first mode or in the second mode depends on a size of the first window. The first input comprises input dragging a portion of the first window. When a second GUI component of the first window is smaller than a critical size, the first window is in the first mode. In another example, when the first GUI component is smaller than a critical size, the first window is in the first mode. When the first window is in the second mode and the detailed information is displayed, the detailed information is displayed in a second scrollable area in the second window. The detailed information is a list of options. The second window is a top level window. A layout of the detailed information in the first scrollable area is substantially the same as a layout of the detailed information in the second window. In one example, the first window automatically reduces to a size large enough to accommodate all GUI components of the first window.

According to a further embodiment of the invention, a method to display a graphical user interface (GUI) includes: determining a size of a first GUI component of a first window, the first GUI component having detailed information; when the first GUI component is in a first size, displaying the detailed information in the first window; when the first GUI component is in a second size, displaying the detailed information in the first window; when the first GUI component is in a third size, displaying the first GUI component without showing the detailed information in the first window and displaying the detailed information in a second window in response to receiving input to the first GUI component. When the GUI component is changed from the first size to the second size, the area occupied by the detailed information changes. In one example according to this aspect, a representation of the detailed information is scaled to display the detailed information in the first window. The detailed information is displayed in a scrollable area in the first window. The first GUI component automatically reduces to the third size when an area allocated for the first GUI component in the first window is smaller than a critical size; and the first window automatically reduces to a size large enough to contain all GUI components of the first window after automatically reducing the first GUI component to the third size.

The present invention includes apparatuses which perform these methods, including data processing systems which perform these methods and computer readable media which when executed on data processing systems cause the systems to perform these methods.

Other features of the present invention will be apparent from the accompanying drawings and from the detailed description which follow.

BRIEF DESCRIPTION OF THE DRAWINGS

The present invention is illustrated by way of example and not limitation in the figures of the accompanying drawings in which like references indicate similar elements.

DETAILED DESCRIPTION

The following description and drawings are illustrative of the invention and are not to be construed as limiting the invention. Numerous specific details are described to provide a thorough understanding of the present invention. However, in certain instances, well known or conventional details are not described in order to avoid obscuring the description of the present invention.

Figure 1:
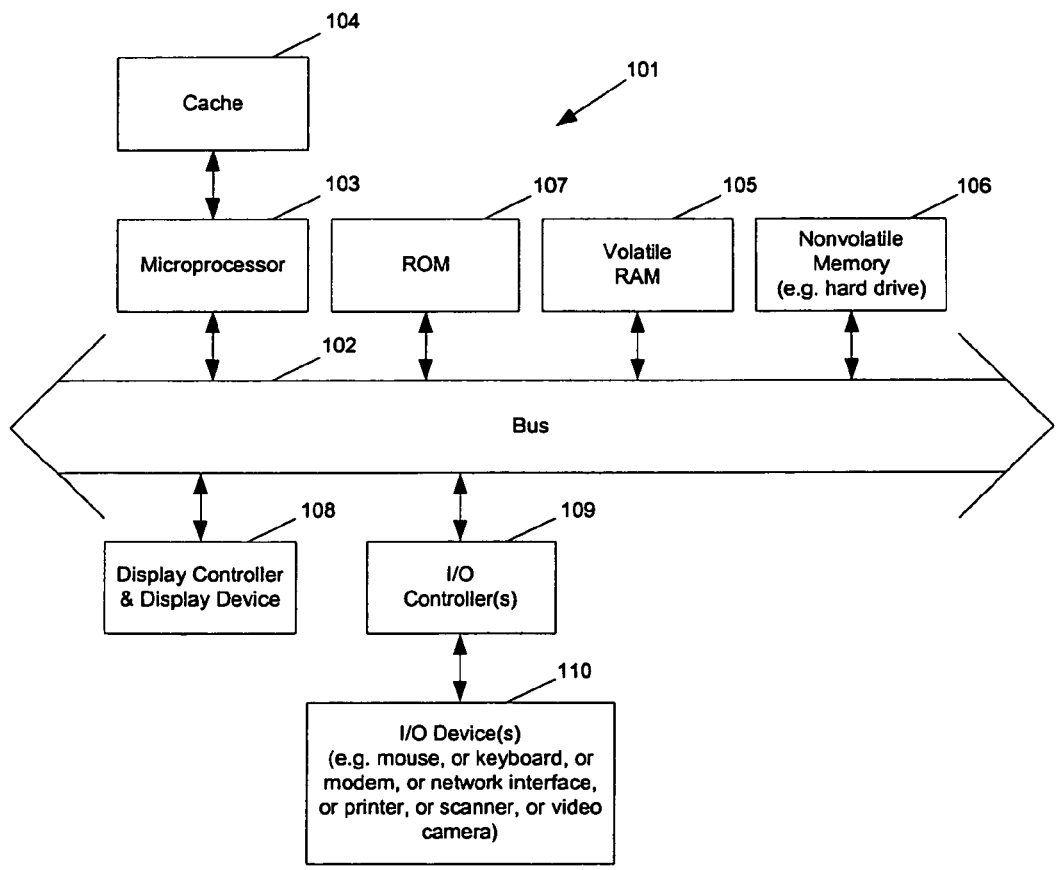
FIG. 1 shows a block diagram example of a data processing system which may be used with the present invention.
Figure 2:
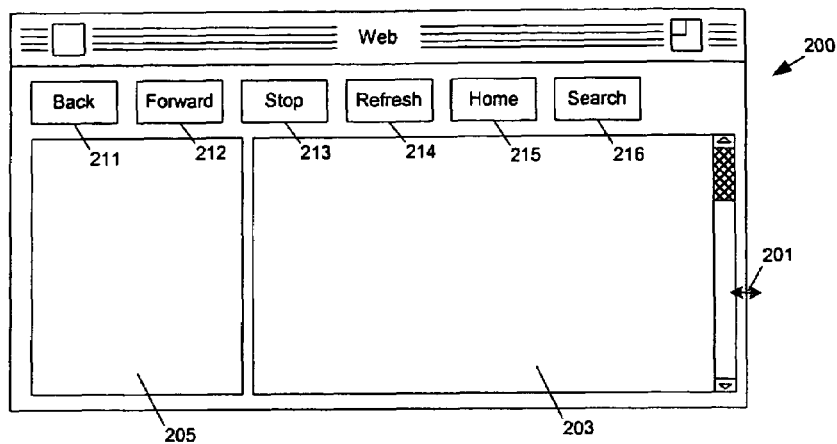
FIGS. 2-4 show a prior art method of rearranging buttons.
Figure 3:
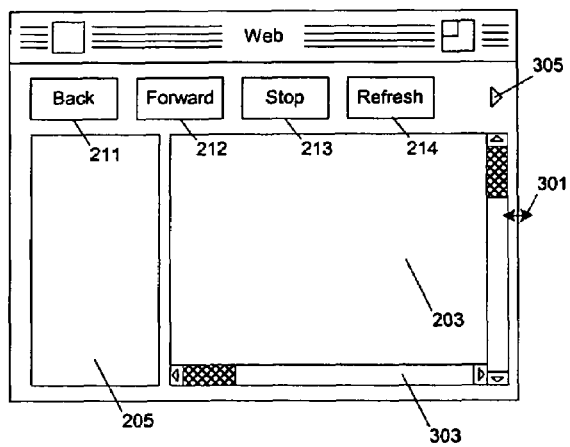
Figure 4:
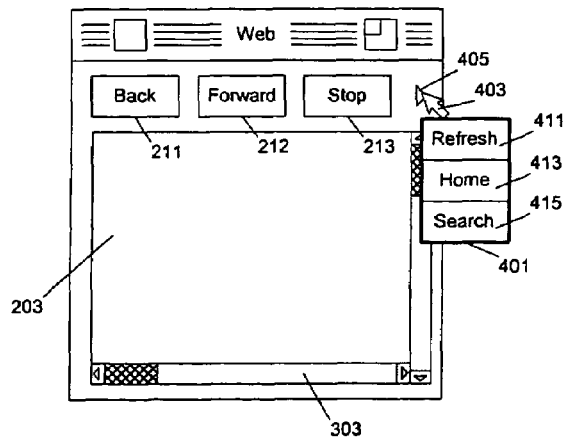
Figure 5:
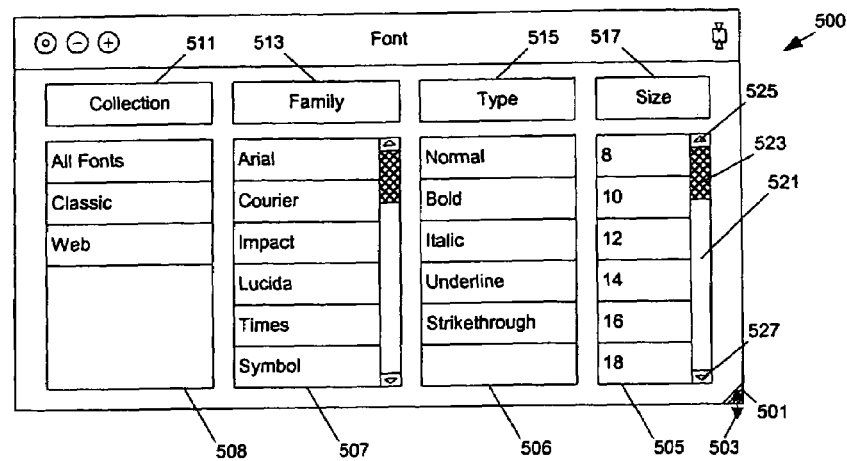
FIGS. 5-8 show examples of switching between a normal mode and a mini mode for a graphical user interface according to one embodiment of the present invention.

FIG. 1 shows one example of a typical computer system which may be used with the present invention. Note that while FIG. 1 illustrates various components of a computer system, it is not intended to represent any particular architecture or manner of interconnecting the components as such details are not germane to the present invention. It will also be appreciated that network computers and other data processing systems which have fewer components or perhaps more components may also be used with the present invention. The computer system of FIG. 1 may, for example, be an Apple Macintosh computer.

As shown in FIG. 1, the computer system 101, which is a form of a data processing system, includes a bus 102 which is coupled to a microprocessor 103 and a ROM 107 and volatile RAM 105 and a non-volatile memory 106. The microprocessor 103, which may be a G3 or G4 microprocessor from Motorola, Inc. or IBM is coupled to cache memory 104 as shown in the example of FIG. 1. The bus 102 interconnects these various components together and also interconnects these components 103, 107, 105, and 106 to a display controller and display device 108 and to peripheral devices such as input/output (I/O) devices which may be mice, keyboards, modems, network interfaces, printers, scanners, video cameras, microphones and other devices which are well known in the art. Typically, the input/output devices 110 are coupled to the system through input/output controllers 109. The volatile RAM 105 is typically implemented as dynamic RAM (DRAM) which requires power continually in order to refresh or maintain the data in the memory. The non-volatile memory 106 is typically a magnetic hard drive or a magnetic optical drive or an optical drive or a DVD RAM or other type of memory systems which maintain data even after power is removed from the system. Typically, the non-volatile memory will also be a random access memory although this is not required. While FIG. 1 shows that the non-volatile memory is a local device coupled directly to the rest of the components in the data processing system, it will be appreciated that the present invention may utilize a non-volatile memory which is remote from the system, such as a network storage device which is coupled to the data processing system through a network interface such as a modem or Ethernet interface. The bus 102 may include one or more buses connected to each other through various bridges, controllers and/or adapters as is well known in the art. In one embodiment the I/O controller 109 includes a USB (Universal Serial Bus) adapter for controlling USB peripherals.

It will be apparent from this description that aspects of the present invention may be embodied, at least in part, in software. That is, the techniques may be carried out in a computer system or other data processing system in response to its processor, such as a microprocessor, executing sequences of instructions contained in a memory, such as ROM 107, volatile RAM 105, non-volatile memory 106, cache 104 or a remote storage device. In various embodiments, hardwired circuitry may be used in combination with software instructions to implement the present invention. Thus, the techniques are not limited to any specific combination of hardware circuitry and software nor to any particular source for the instructions executed by the data processing system. In addition, throughout this description, various functions and operations are described as being performed by or caused by software code to simplify description. However, those skilled in the art will recognize what is meant by such expressions is that the functions result from execution of the code by a processor, such as the microprocessor 103.

At least one embodiment of the present invention seeks to utilize GUI components with different modes such that the GUI components can be displayed and accessed differently in different modes. When a window is large enough to display detailed information effectively, a GUI component displays the detailed information in a normal mode; when the window is resized such that the detailed information cannot be effectively displayed in a small area, the GUI component enters a mini mode, in which the detailed information is hidden. However, the GUI component is still displayed in the mini mode with essential information about the GUI component so that a user can easily access the detailed information when needed.

Figure 18:
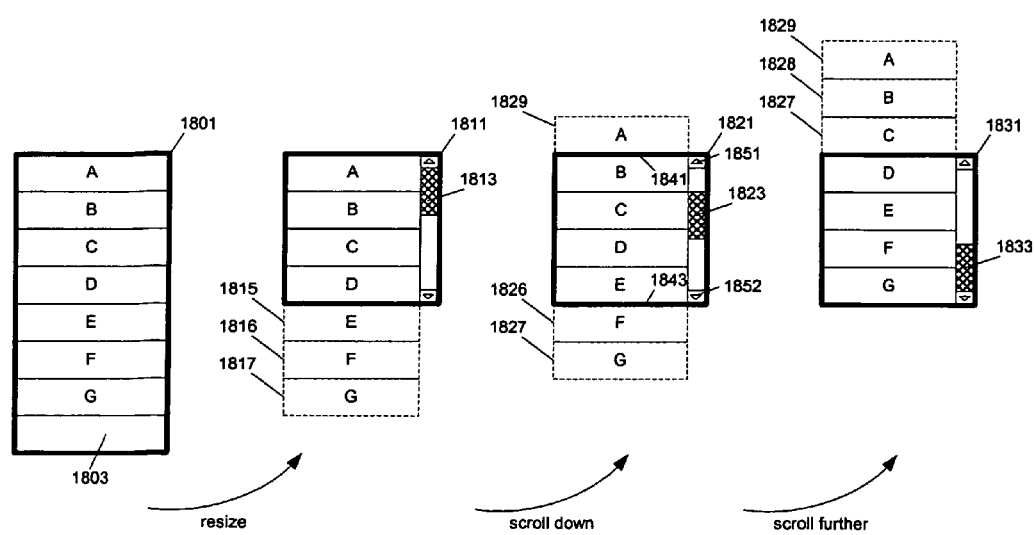
FIGS. 18-19 show examples of scrollable views which may be used with the present invention.
Figure 19:
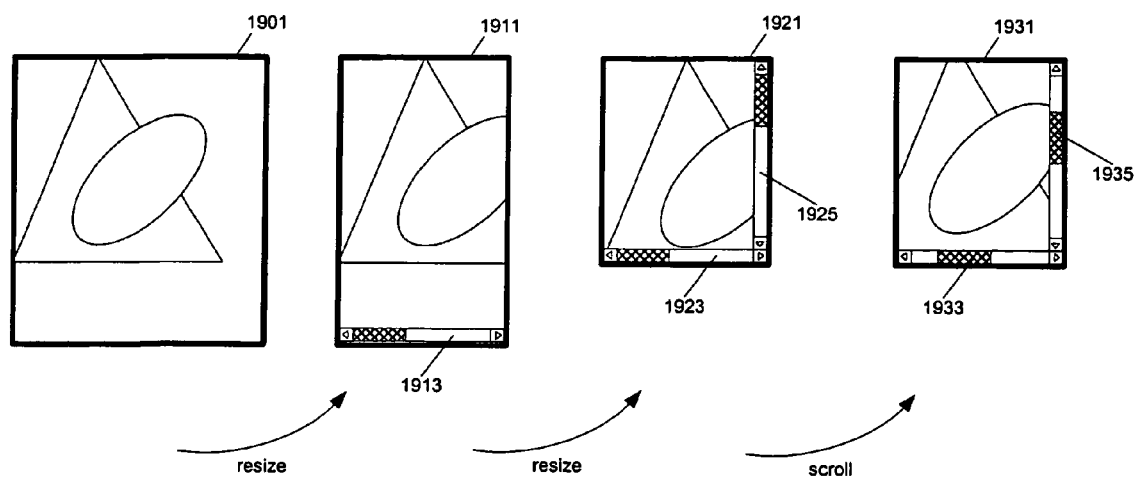

FIGS. 18-19 show examples of scrollable views which may be used with the present invention. FIG. 18 shows examples of scrollable list views. When a list is displayed in scrollable list view 1801, which is large enough to make all the items visible simultaneously, blank space 1803 may be used to fill up the remaining space. When the view is resized, the blank space may be enlarged or reduced; however, the area for displaying the list remains the same, since the size of each item normally is fixed.

When the scrollable list view is resized to view 1811, only a portion of the list is visible simultaneously in view 1811. Thus, a scroll bar 1813 appears so that other portions of the list can be brought into view 1811. Since invisible items 1815-1817 are all bellow the bottom of view 1811 and the top portion of the entire list is visible in view 1811, thumb 1813 is at the top of the slider. When thumb 1813 is moved down to a position 1823 in view 1821, the list scrolled up so that item 1829 becomes invisible and item 1815 becomes visible. Items 1826 and 1827 are still invisible. When thumb 1823 is moved further down to the bottom (1833) of the slider, the bottom portion of the list is visible in view 1831; the top portion of list (items 1827-1829) becomes invisible. Typically, the scrollable list view scrolls the list one item at a time, although it may scroll several at a time. The list may be scrolled with a scroll bar, or arrows (e.g., pressing arrow 1851 or 1852), or other means (e.g., up and down arrows on a keyboard). For example, a cursor may be placed near (or above) area 1841 to scroll down a list and near (or below) area 1843 to scroll up the list.

FIG. 19 shows examples of scrollable views, which can be scrolled continuously and smoothly. When the width of view 1901 is resized to that of view 1911, scroll bar 1913 appears to allow horizontal scrolling. When the height of view 1911 is resized to that of view 1921, scroll bar 1925 appears to allow vertical scrolling, in addition to scroll bar 1923 for horizontal scrolling. When thumbs 1933 and 1935 are moved to positions in view 1931 from view 1921, a different portion of the detailed information (which is shown entirely in view 1901) becomes visible in view 1931.

Figure 20:
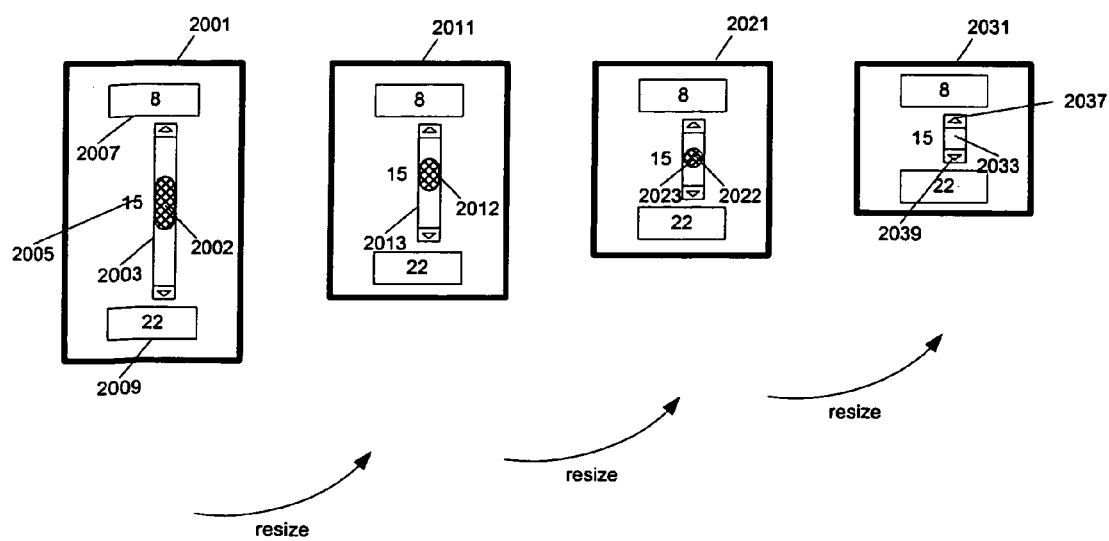
FIG. 20 shows an example of scaling a representation of displayed information according to one embodiment of the present invention.

FIG. 20 shows an example of scaling a representation of displayed information according to one embodiment of the present invention. View 2001 displays labels (or text entries) 2007 and 2009 and slider 2003. The value displayed in label 2007 (or 2009) corresponds to the minimum (or the maximum) value for the slider when the thumb 2002 is at the top (or the bottom) position of the slider. From the position of thumb 2002 and the maximum and minimum values displayed on labels 2007 and 2009, the slider determines the current value for display on label 2005. Thumb 2002 can be moved along slider 2003 to change the current value. When view 2001 is resized to view 2011, slider 2013 and thumb 2012 are resized so that all components can be visible within view 2011. When view 2011 is further resized to view 2021, the sizes of slider 2023 and thumb 2022 are further reduced. When view 2021 is further resized to view 2031, the size of slider 2033 is reduced; and no thumb is visible. In view 2031 (as well as in views 2001, 2011, 2021), scroll arrows (2037 and 2039) can be use to scroll.

FIGS. 5-8 show examples of switching between a normal mode and a mini mode for a graphical user interface according to one embodiment of the present invention. Window 500 provides a user interface for setting font attributes (e.g., font family, type, size). Labels 511, 513, 515 and 517 indicate the attributes that a user may adjust. Selection lists 508, 507, 506 and 505 display the optional parameters for corresponding attributes. A user can select a value from a list to set the corresponding attribute to the selected value. Since the list of parameters is too large to fit into display area 505, a scroll bar 521 is provided. Arrows 527 and 525 can be used to scroll the list up and down when pressed; and thumb 523 can be moved along the scroll control 521 to scroll the list. For example, when the user wants to set the font size to 24, which is not currently visible in display area 505, the user can press arrow 527, or pull down thumb 523 (toward arrow 527), to scroll up the list so that options for size larger than 18 can be brought into display area 505. Once the desirable parameter is in display area 505, the user can select it.

Figure 6:
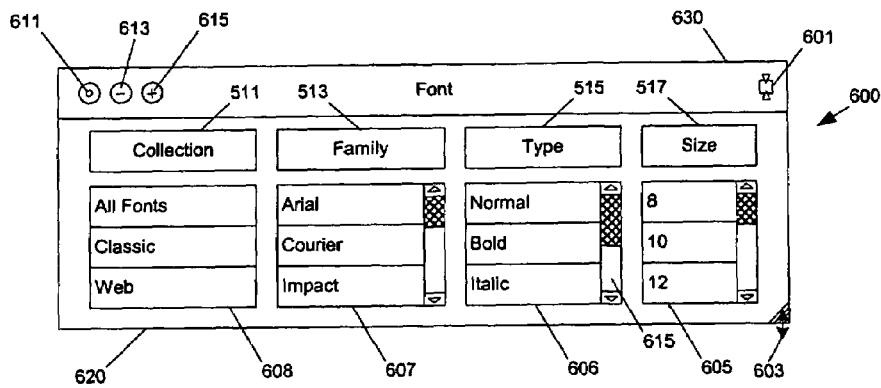

The user can drag the portion 501 with cursor 503 to resize window 500. When it is resized as window 600 in FIG. 6, labels 511-517 remains on top of selection lists 608, 607, 606 and 605. Since the height of the window is changed, the heights of selection lists 608, 607, 606 and 605 are adjusted accordingly so that all GUI components can be displayed within window 600. In window 500, all options for font type (515) can be fitted in display area 506. However, after changing from window 500 to window 600, not all options for font type can be fitted into display area 606. Thus, scroll bar 615 appears to help the user to navigate through the list of options when necessary. In FIG. 6 (or FIG. 5), the GUI components are in a normal mode, where detailed options are shown in selection lists below the labels.

In addition to optional icon buttons 611, 613 and 615 for closing the window, minimizing the window, and maximizing the window respectively, window 600 has an optional button 601 for switch from the normal mode to a mini mode. Alternatively, the user can further reduce the size of the window by dragging with cursor 603 to switch from the normal mode to the mini mode. In another embodiment of the present invention, window 600 does not have button 601 for switching mode; and mode switching occurs only when the window is resized (via a dragging operation) to have a height smaller than a predetermined value. In an alternative embodiment of the present invention, a toggle button is located inside area 620 for mode switching (instead of icon button 601 on title bar 630).

Once in the mini mode (e.g., FIG. 7 or FIG. 8), the options lists are displayed as combination boxes (combo boxes) or pop-up menus. Selection lists 605-608 in the normal mode are converted into combo boxes (or pop-up menus) 705-708 in the mini mode. In a combo box, a user can select an item from a pop-up menu, or directly typing in a desirable value (e.g., combo box 705 for inputting a size); in a pop-up menu, a user can only select one from a predetermined list of values (e.g., pop-up menu 706). For example, when the user uses cursor 803 to select area 807 (e.g., pressing a button with cursor 803 on area 807, or stopping cursor 803 on area 807), a scrollable pop-up menu 805 appears. Since the area for the menu is not large enough to display all options simultaneously, a scroll bar appears in the pop-up menu 805 in one embodiment of the invention. Note that a scrollable pop-up menu might not in some cases have a scroll control. Various techniques (e.g., scrolling when a cursor is on (or outside) the boundary of an area, or when an arrow is pressed) for scrolling can be use with a scrollable view (e.g., scrollable list, scrollable menu, canvas, text area).

Figure 7:
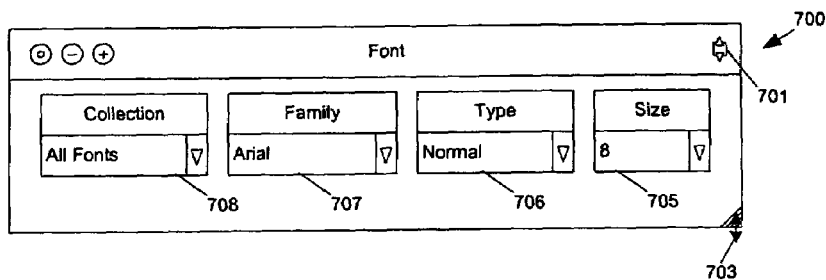
Figure 8:
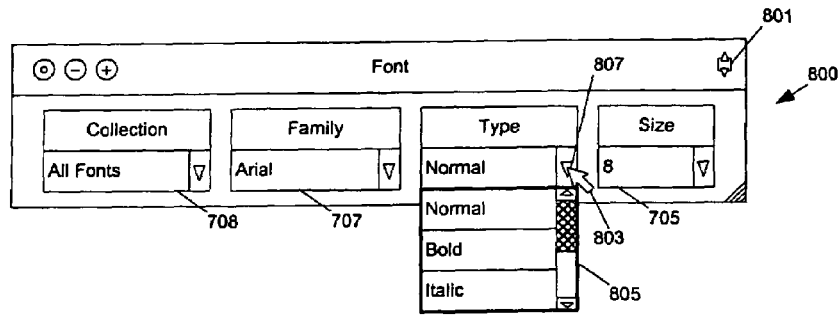

In one embodiment of the present invention, once the user drags with cursor 603 in FIG. 6 to reduce the height of window 600 to that of window 700 (or to some predetermined size), mode switching occurs. In one example, the window automatically further reduces the height to that of window 800, which is a minimum size required for containing all components in the mini mode (rather than stopping at the point at which the user completes the dragging operation which shrinks the window). FIG. 7 shows an example of a window which was reduced in size by, for example, a dragging operation, yet the window was not automatically reduced to a minimum size as is shown in FIG. 8. With the embodiment which automatically reduces the size to a minimum size, the system would further reduce the size to the minimum size without any further instruction from the user. Once a window reaches the minimum size required for containing all components in the mini mode, the window is not normally further reduced. Any attempt to drag the window to a size smaller than the minimum size will be ignored. Alternatively, a drag of a length longer than a predetermined value minimizes the window into an icon.

In another embodiment of the present invention, when optional icon button 601 is pressed, window 600 in the normal mode is switched into window 700 in the mini mode. When icon button 701 is pressed, window 700 in the mini mode is switched back to window 600. In one example, a window remembers the size of the window in the normal mode such that it can be switched back from the mini mode to the previous state in the normal mode. In another example, mode switch buttons (e.g., 801, 701 and 601) change the mode and resize the window to predetermined sizes by toggling between the two modes/sizes.

Figure 9:
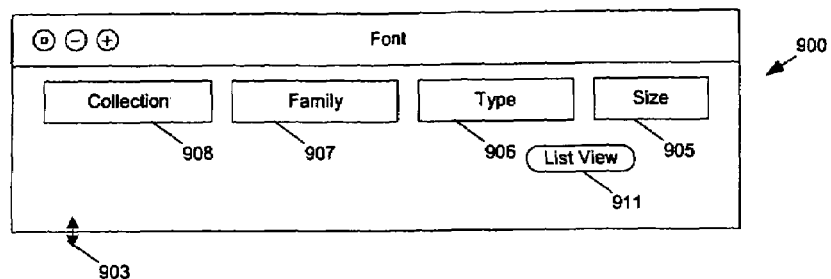
FIGS. 9-12 show alternative user interfaces for a normal mode and a mini mode according to alternative embodiments of the present invention.
Figure 10:
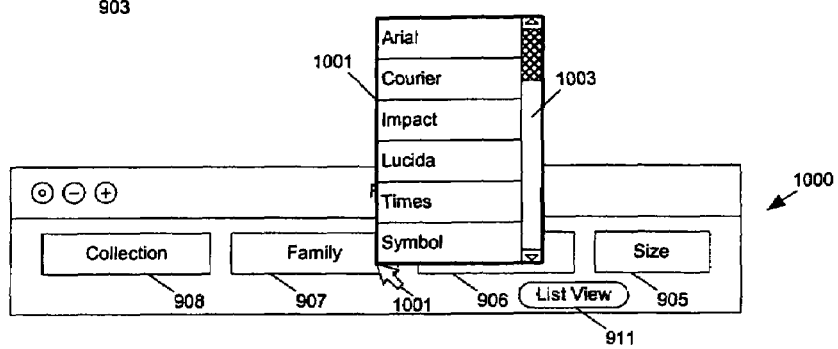

FIGS. 9-12 show alternative user interfaces for a normal mode and a mini mode according to alternative embodiments of the present invention. FIG. 9 shows an example where the components in a mini mode are displayed as buttons. When in a mini mode, lists 605-608 (in FIG. 6) with corresponding labels are converted into buttons 905-908, which when activated display the corresponding selection lists in popup windows. For example, when cursor 1001 is over button 907 in FIG. 10 (or otherwise selects button 907), pop-up menu 1001 appears with scroll control 1003 for the user to select a desirable menu. These buttons in the mini mode may bring up a combo box, a pop-up menu, a slider, a dialog box, or others in a separate popup window (or, top level window), which may be movable, in order to display the detailed information that is normally hidden in the mini mode. Typically, the layout of the detailed information in the popup window is the same or very similar to that in the normal mode such that the user can easily identify the contents in the popup window. For example, the arrangement in a row of the buttons 905-908 matches the arrangement in a row of the lists 605-608.

Figure 11:
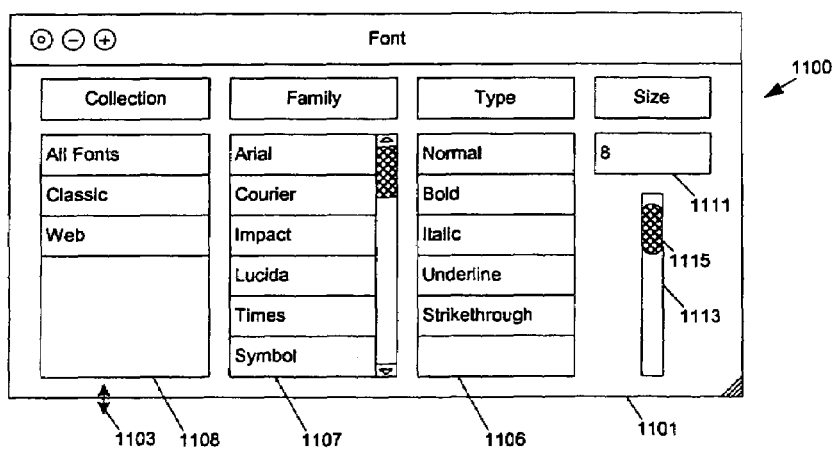
Figure 12:
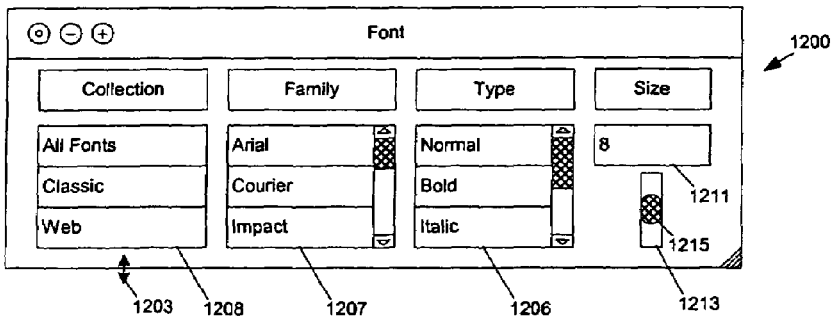

Window 1100 in FIG. 11 shows slider 1113 for setting font size 1111. When thumb 1115 moves along slider 1113, a font size is determined from the position of thumb 1115. After the user drags with cursor 1103 to resize window 1100 to window 1200, the heights of selection lists 1106-1108 are reduced to form selection lists 1206-1208. Slider 1113 is resized to slider 1213; and thumb 1115 is resized into thumb 1215. The user can further drag with cursor 1203 to switch from window 1200 in the normal mode to window 900 (in FIG. 9) a mini mode. On the other hand, the user can also drag with cursor 903 to increase the size of window 900 in order to switch back to the normal mode (e.g., window 1200).

In FIG. 9, button 911 is provided in the window in the mini mode. When "pushed" (e.g., a user selects the button by positioning the cursor over the button and pressing a button such as a mouse's button), button 911 causes window 900 to return to the normal mode (e.g., window 1100 in FIG. 11 or window 600 in FIG. 6), where buttons 905-908 will be expanded into selection lists for easy access. Similarly, a window in a normal mode may also have a mode switching button for entering into a mini mode.

In the mini mode, window 1000 takes a minimum area for display of GUI components for accessing the controls represented by the corresponding GUI components, leaving more room for showing other windows. Once button 911 is activated, it switches the window into a normal mode, for example, window 1100. In window 1100, options lists are displayed in scrollable areas (or as slider 1113). Thus, a user can easily see available options; and detailed option lists can be seen for different controls at the same time. A user can access one control easily in a mini mode with a minimum desktop space; and a user can work with multiple controls more effectively when the window is in a normal mode. Thus, switching between a mini mode and a normal mode allows a user to use the user interface effectively for varying situations.

Figure 13:
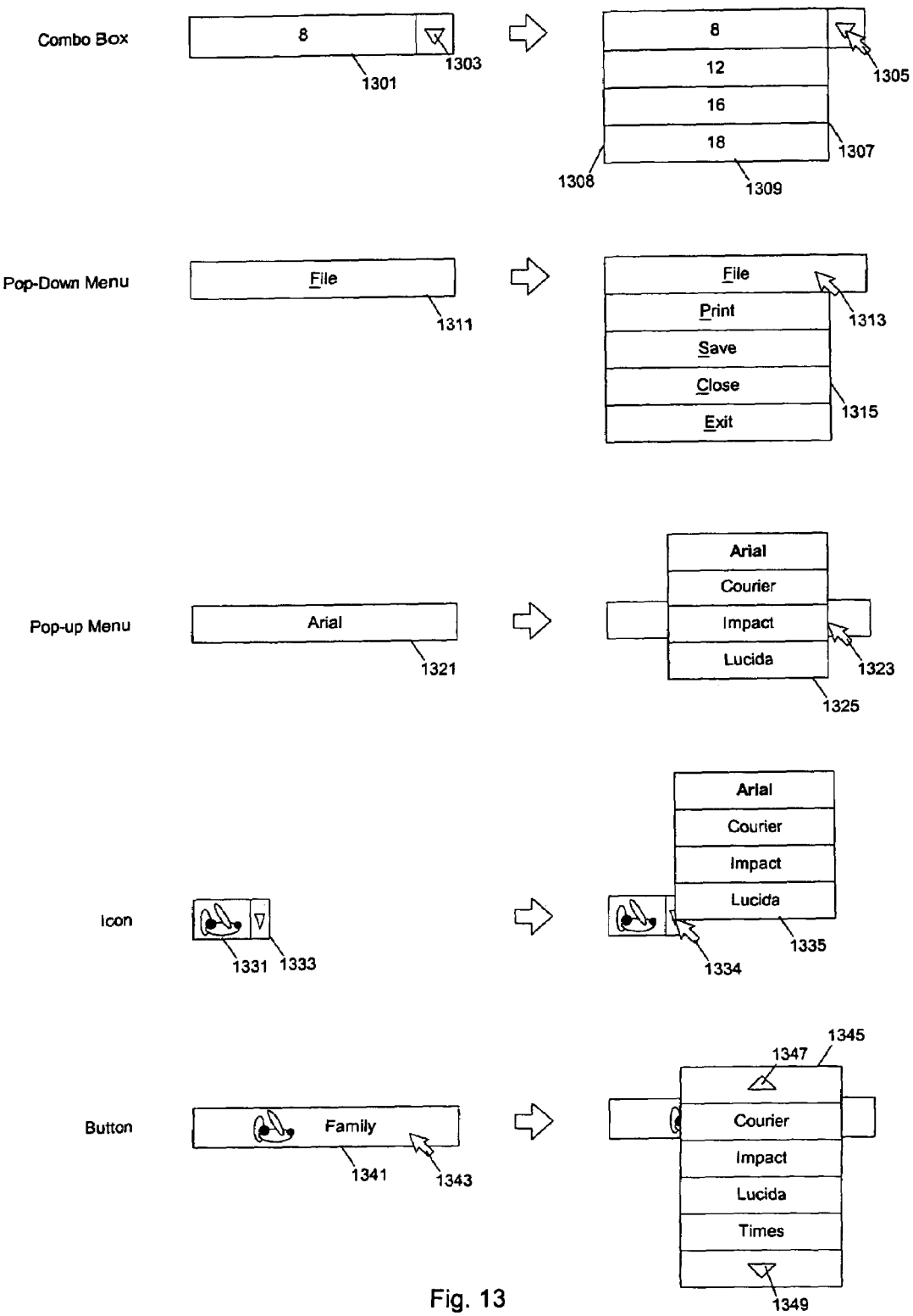
FIG. 13 shows user interface components which may be used in a mini mode according to one embodiment of the present invention.

FIG. 13 shows user interface components which may be used in a mini mode according to one embodiment of the present invention. Combo box 1301 allows the user to directly type in a value, or to pop up a menu 1307 by selecting icon 1303. A scrollable list is displayed in pop-up menu 1307 when activated by cursor 1305. A user may scroll the list by placing the cursor near the boundary of the list. For example, when the cursor is moved to a point near area 1309, the list will scroll up to display the options under item 1308.

Pop-down menu 1311 contains menu items associated with various commands. When pop-down menu 1311 is activated (e.g., by a short cut key, or by being selected with cursor 1313), menu items 1315 pops down to display available commands.

Pop-up menu 1321 allows a user to select one item from a fixed list of items. Typically, a pop-up menu does not allow a user to directly type in a value, thereby limiting the input value to a predetermined set. When activated by cursor 1323, a popup window 1325 shows a scrollable list of items, from which a user can select one by a point and click operation or other methods. When not activated, pop-up menu 1321 displays the current selected value; alternatively, pop-up menu 1321 may display a label (e.g., label 513 in FIG. 5) identifying the purpose of the menu (e.g., the attribute for which a value can be modified by the pop-up menu).

Icon menu 1333 is similar to a pop-up menu 1321. Instead of displaying a selected value or a label, icon 1331 is used to identify the menu. Typically, an icon requires only a small area to display; and typically, an icon is visually pleasing and easy for a user to recognize. When activated by cursor 1334, pop-up menu 1335 appears.

Button 1341 may contain a icon, or a label, or both. When selected by cursor 1343, a popup window 1345 shows a scrollable list, which has arrows 1347 and 1349 for scrolling. When arrow 1347 is pressed, the list in window 1345 scrolls down to reveal more items, if any, from the top of the list; when arrow 1349 is pressed, the list in window 1345 scrolls up to reveal more items, if any, from the bottom of the list. Alternatively, button 1341, when activated, may bring up a movable dialog box, which contains a selection list similar to 1345.

Figure 14:
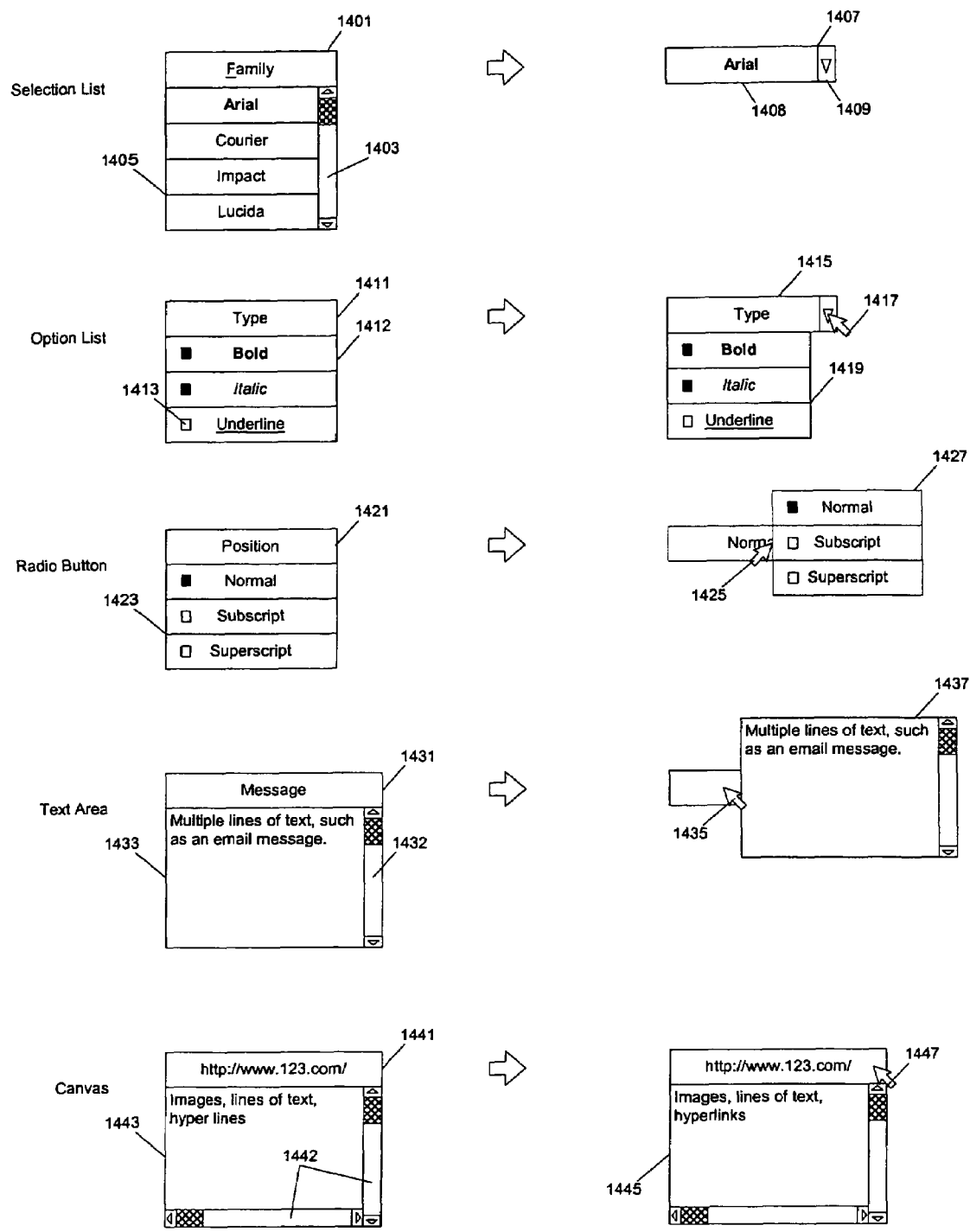
FIG. 14 shows examples of switching from a normal mode to a mini mode for various user interface components according to various embodiments of the present invention.

FIG. 14 shows examples of switching from a normal mode (in the left column of FIG. 14) to a mini mode (in the right column of FIG. 14) for various user interface components according to various embodiments of the present invention. Selection list 1401 in a normal mode may switch to combo box (or a pop-up menu) 1407 in a mini mode. When in a mini mode, list 1405 and scroll bar 1403 is hidden. A selected value is shown at field 1408; and icon 1409 can be selected to activate and bring up the list of options. Alternatively, the label of selection list 1401 ("Family") can be displayed at field 1408.

Label 1411 is associated with a number of options, represented as checkboxes (e.g., checkbox button 1412). The status of the variables associated with each checkbox button (or toggle button) is indicated by the corresponding box (e.g., 1413). When in a mini mode, label 1411 is converted into pop-down menu 1415, which when activated by cursor 1417, shows options in popup window 1419.

Similarly, label 1421 is associated with a group of radio buttons 1423. When switched into a mini mode, the selected value is display on a pop-up menu button, which when activated by cursor 1425, brings up a pop-up menu 1427.

Label 1431 is followed by scrollable text area 1433. When entering a mini mode, label 1431 is converted into push button, which when activated by cursor 1435, brings up scrollable text area 1437 in a pop up window. Scrollable text area 1437 can also be displayed in a movable dialog window.

Similarly, text entry 1441 is associated with canvas 1443. Canvas 1443 displays detailed information related to the text in entry 1441. For example, entry 1441 may be for a web address; and canvas 1443 displays a web page at the web address. Scroll bars 1442 can be used to bring portions of the web page that is not currently visible within canvas 1443. When in a mini mode, text entry 1441 is converted into a combo box type of button, which allows a user to type in or modify text information and to pop up canvas 1445 in a separate window.

Figure 15:
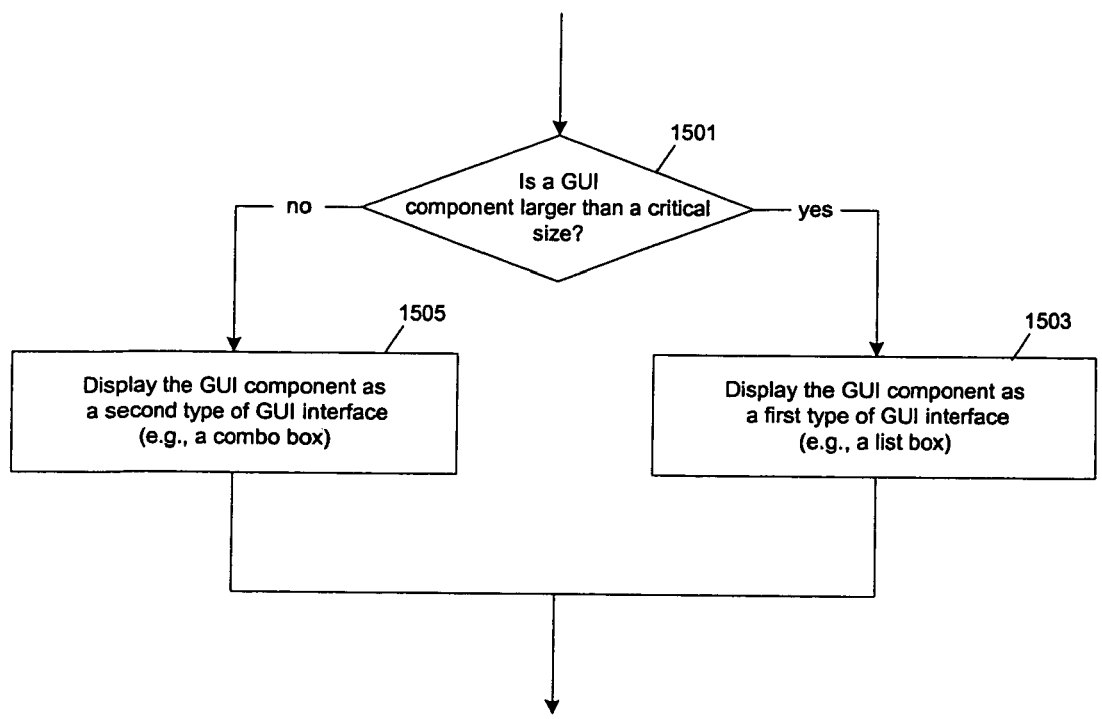
FIGS. 15-17 show flow chart examples of methods to switch user interface components between a normal mode and a mini mode according to various embodiments of the present invention.
Figure 16:
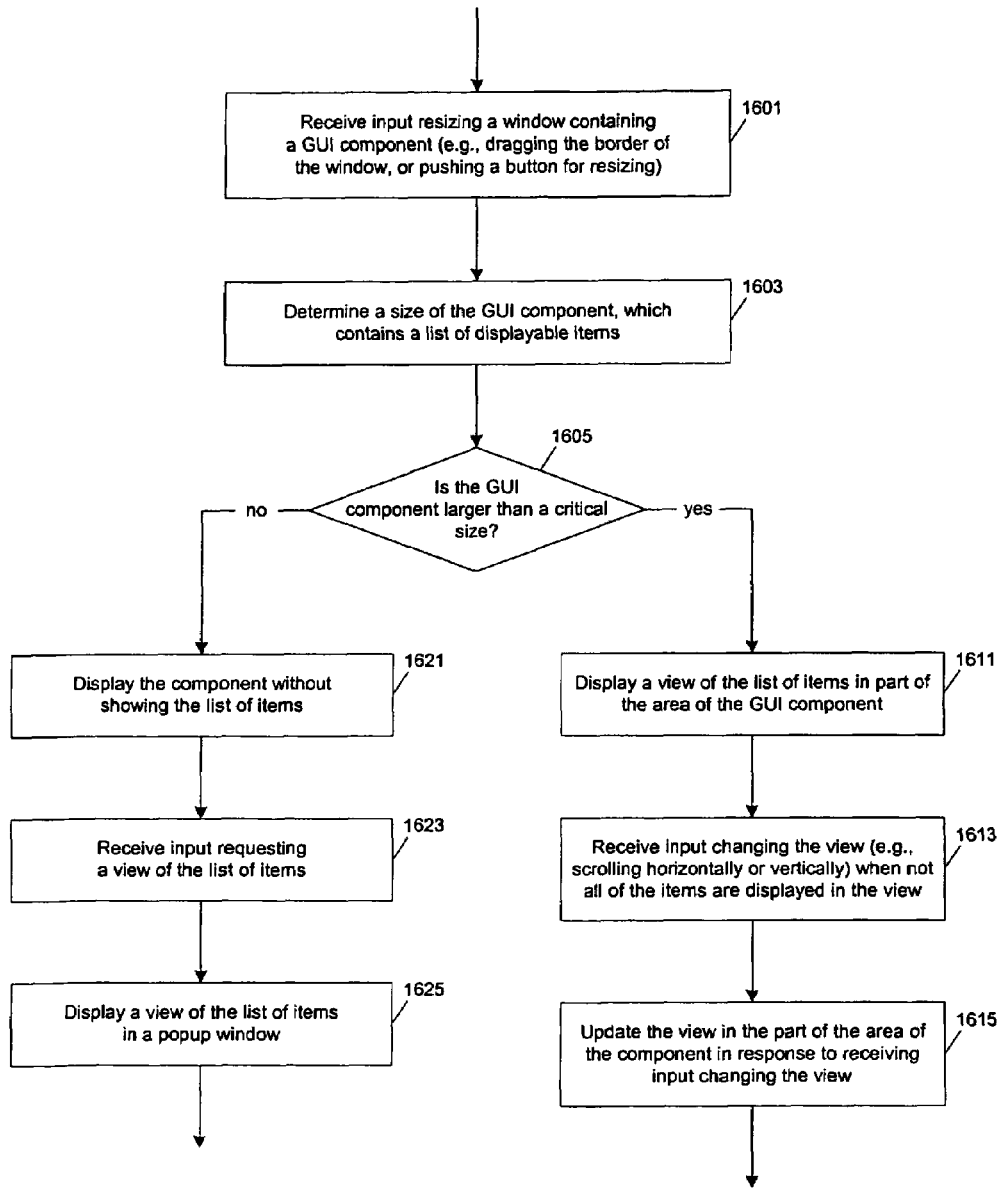
Figure 17:
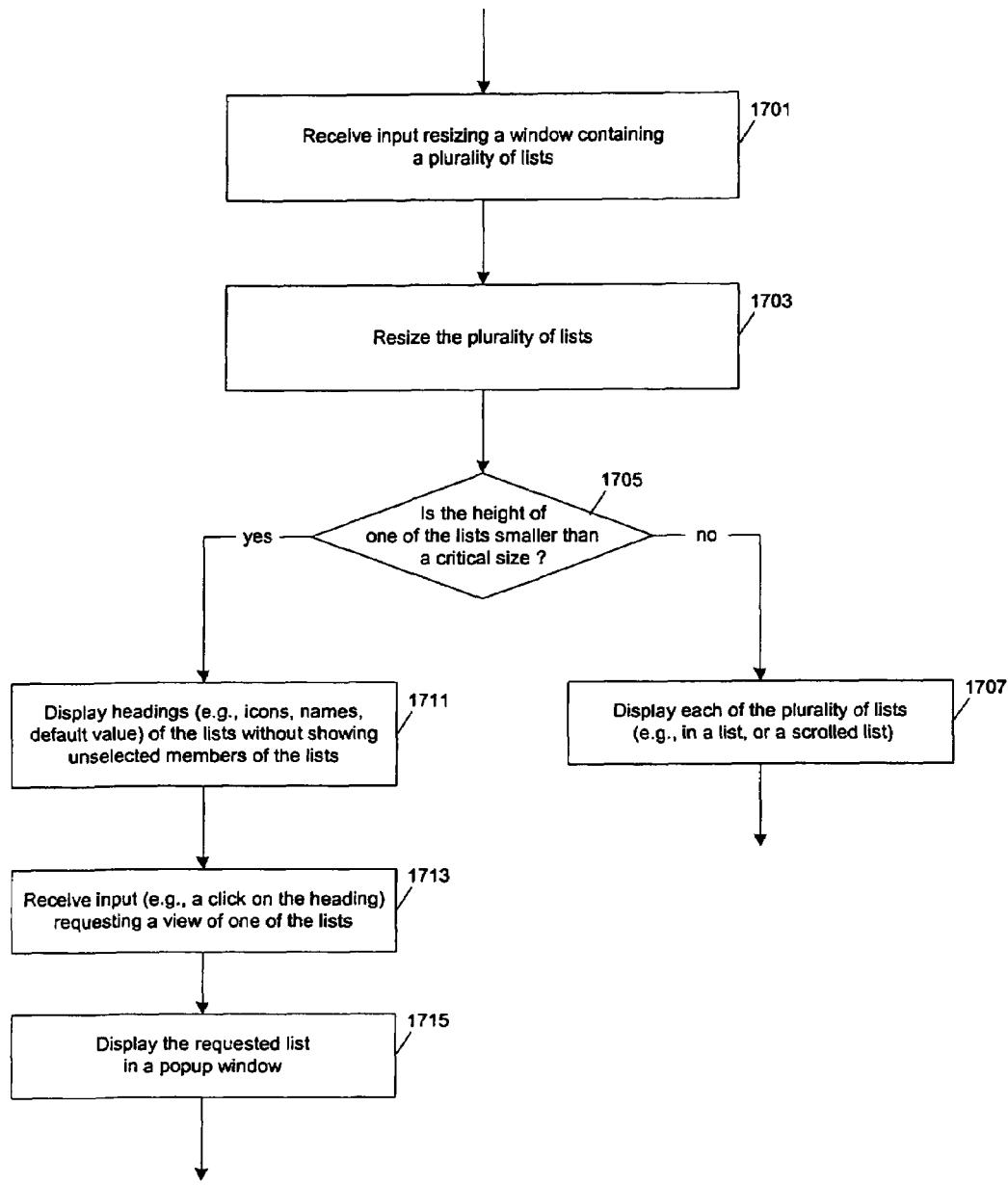

FIGS. 15-17 show flow chart examples of methods to switch user interface components between a normal mode and a mini mode according to various embodiments of the present invention.

FIG. 15 shows an overall flow chart of a method to switch modes for a user interface component according to one embodiment of the present invention. Operation 1501 determines if a GUI component is larger than the critical size (e.g., a predetermined size). When the GUI component is resized such that the GUI component is larger than the critical size, operation 1503 displays the GUI component as a first type of GUI interface (e.g., a list box in a normal mode); otherwise, operation 1505 displays the GUI component as a second type of GUI interface (e.g., a combo box or a pop-up menu in a mini mode).

FIG. 16 shows a flow chart of a method to switch modes for a user interface component according to one embodiment of the present invention. Operation 1601 receives input specifying resizing a window containing a GUI component (e.g., dragging the border of the window, or pushing a button for resizing). The GUI component contains a list of displayable items, such as a selection list, or an option list, or others. Operation 1603 determines a size of the GUI component. When operation 1605 determines that the GUI component is larger than a critical size (e.g., a predetermined size), operation 1611 displays (in a normal mode) a view of the list of items in part of the area of the GUI component in the window; when operation 1613 receives input changing the view (e.g., scrolling horizontally or vertically when not all of the items are currently visible in the view), operation 1615 updates the view in the part of the area of the component (e.g., to display an updated portion of the list). When operation 1605 determines that the GUI component is not larger than the critical size, operation 1621 displays (in a mini mode) the component without showing the list of items; when operation 1623 receives input requesting a view of the list of items, operation 1625 displays a view of the list of items in a popup window (which is different from the window in which the component is displayed).

In one embodiment of the present invention, each of the GUI components of a window switches between a normal mode and a mini mode individually, when the window is resized. In another embodiment of the present invention, once one of the GUI components enters a mini mode, other GUI components are forced into the mini mode. In a further embodiment of the present invention, mode switching for GUI components is performed on a group basis.

FIG. 17 shows a flow chart of another method to switch between at least two modes for a user interface component according to one embodiment of the present invention. After operation 1701 receives input indicating resizing a window containing a plurality of lists, operation 1703 resizes the plurality of lists. When operation 1705 determines the height of none of the list is smaller than a critical size (e.g., a predetermined size), operation 1707 displays, in a normal mode, each of the plurality of lists (e.g., in scrollable views). Otherwise, operation 1711 displays, in a mini mode, headings (e.g., icons, names, or default values) of the lists without showing unselected members of the lists; when operation 1713 receives input (e.g., "clicking" on a heading, pausing the cursor on the heading, pressing a shortcut key, or others) requesting a view of one of the list, operation 1715 displays the requested list in a popup window. According to this embodiment of the present invention, the plurality of lists enters the mini mode on a group basis. It will be appreciated that the various embodiments of the methods in this disclosure may use different techniques to determine when to switch between at least two modes. For example, when a user resizes a window (e.g., by dragging an edge of the window) the system may determine when the displayed size of the window (e.g., length of the perimeter or window area or height of window) falls below a predetermined size and automatically switch modes. As another example, as the window is resized, the system may determine when the displayed size of an object (e.g., a scrollable list view) in the window falls below a predetermined size and automatically switch modes. As another example, the system may automatically switch modes for a window (e.g., this switching may be based on the number of windows displayed; if more than a certain number of windows is displayed or the amount of screen display area used by all displayed windows exceeds a certain percentage then the system may determine to switch between a normal mode and a mini mode for one or more windows).

In the foregoing specification, the invention has been described with reference to specific exemplary embodiments thereof. It will be evident that various modifications may be made thereto without departing from the broader spirit and scope of the invention as set forth in the following claims. For example, various embodiments described herein may be used with a system which recognizes the speech (e.g., spoken commands) of the user. In this case, the user may open a window and switch between the modes (e.g., normal and mini) by speaking commands. The specification and drawings are, accordingly, to be regarded in an illustrative sense rather than a restrictive sense.

What is claimed is:

1. A method of controlling a display of a data processing system, said method comprising:
    displaying a first list as a scrollable view of items in a first mode;
    receiving an input to resize a window to switch from said first mode to a second mode; and
    displaying in response to the input, in said second mode, a representation of a command which when activated causes a display of a second list of said items and wherein, in the second mode, the second list that is associated with the first list of items in the first mode is not displayed when the command is not activated, wherein the window automatically enters mini mode in the second mode;
    wherein said first list is displayed within the window and said representation is displayed within said window.

2. A method as in claim 1 wherein the representation of the command is a button.

3. A method as in claim 2 wherein the first and second lists have the same content.

4. A method as in claim 1 wherein said input comprises dragging a portion of said window which contains the scrollable view.

5. A method as in claim 4 wherein the window shrinks to a minimal predetermined size independently of a drag length when the drag length causes said window to reach a predetermined size.

6. A method as in claim 1 wherein said input is clicking a button.

7. A method as in claim 1 wherein said second list is displayed within a movable window.

8. A method as in claim 1 wherein said window has buttons for closing the window, minimizing the window and maximizing the window.

9. A method as in claim 8 wherein the window contains a plurality of scrollable views in the first mode.

10. A method as in claim 1 wherein the scrollable view of said items is a scrollable list view of said items.

11. A method as in claim 10 wherein the scrollable list view contains at least one of:
    a) scroll arrows; and
    b) scroll bar
    for scrolling the first list.

12. A method as in claim 1 wherein the second list is scrollable.

13. A method of controlling a display of a data processing system, said method comprising:
    displaying, in a first mode, a slider control having a slider which can be positioned in one of a plurality of positions to select through the position of the slider alone, a corresponding one of a plurality of parameters;
    receiving an input to resize a window to switch from said first mode to a second mode;
    displaying, in said second mode, a representation of a command which when activated causes a display of a list of items corresponding to at least a subset of said plurality of parameters, wherein the list of items is not displayed when the command is not activated.

14. A method as in claim 13 wherein the representation of the command is a button.

15. A method as in claim 13 wherein content of the plurality of positions matches corresponding ones of said items.

16. A method as in claim 13 wherein said input is determined from dragging a portion of a window containing the slider.

17. A method as in claim 13 wherein said input is determined from clicking a button.

18. A method as in claim 13 wherein said displaying said slider control and said displaying, in said second mode, occur within a movable window.

19. A method as in claim 18 wherein the window has buttons for closing the window, minimizing the window and maximizing the window.

20. A method as in claim 19 wherein the windows shrinks to a minimal predetermined size independently of a drag length when the drag length causes said window to reach a predetermined size.

21. A computer readable media containing executable computer program instructions which when executed by a digital processing system cause said system to perform a method of controlling a display of a data processing system, said method comprising:
    displaying a first list as a scrollable view of items in a first mode;
    receiving an input to resize a window to switch from said first mode to a second mode; and
    displaying in response to the input, in said second mode, a representation of a command which when activated causes a display of a second list of said items and wherein, in the second mode, the second list that is associated with the first list of items in the first mode is not displayed when the command is not activated, wherein the window automatically enters mini mode in the second mode;

wherein said first list is displayed within the window and said representation is displayed within said window.

22. A media as in claim 21 wherein the representation of the command is a button.

23. A media as in claim 22 wherein the first and second lists have the same content.

24. A media as in claim 21 wherein said input comprises dragging a portion of said window which contains the scrollable view.

25. A media as in claim 24 wherein the window shrinks to a minimal predetermined size independently of a drag length when the drag length causes said window to reach a predetermined size.

26. A media as in claim 21 wherein said input is clicking a button.

27. A media as in claim 21 wherein said second list is displayed within a movable window.

28. A media as in claim 21 wherein said window has buttons for closing the window, minimizing the window and maximizing the window.

29. A media as in claim 28 wherein the window contains a plurality of scrollable views in the first mode.

30. A media as in claim 21 wherein the scrollable view of said items is a scrollable list view of said items.

31. A media as in claim 30 wherein the scrollable list view contains at least one of:
  a) scroll arrows; and
  b) scroll bar
for scrolling the first list.

32. A media as in claim 21 wherein the second list is scrollable.

33. A computer readable media containing executable computer program instructions which when executed by a digital processing system cause said system to perform operations comprising:
  displaying, in a first mode, a slider control having a slider which can be positioned in one of a plurality of positions to select through the position of the slider alone, a corresponding one of a plurality of parameters;
  receiving an input to resize a window to switch from said first mode to a second mode;
  displaying, in said second mode, a representation of a command which when activated causes a display of a list of items corresponding to at least a subset of said plurality of parameters in response to the input, wherein the list of items is not displayed when the command is not activated.

34. A media as in claim 33 wherein the representation of the command is a button.

35. A media as in claim 33 wherein content of the plurality of positions matches corresponding ones of said items.

36. A media as in claim 33 wherein said input is determined from dragging a portion of a window containing the slider.

37. A media as in claim 33 wherein said input is determined from clicking a button.

38. A media as in claim 33 wherein said displaying said slider control and said displaying, in said second mode, occur within a movable window.

39. A media as in claim 38 wherein the window has buttons for closing the window, minimizing the window and maximizing the window.

40. A media as in claim 39 wherein the windows shrinks to a minimal predetermined size independently of a drag length when the drag length causes said window to reach a predetermined size.

41. A data processing system to control a display, comprising:
  means for displaying a first list as a scrollable view of items in a first mode;
  means for receiving an input to resize a window to switch from said first mode to a second mode; and
  means for displaying in response to the input, in said second mode, a representation of a command which when activated causes a display of a second list of said items that is associated with the first list of items in the first mode and wherein, in the second mode, the second list is not displayed when the command is not activated, wherein the window automatically enters mini mode in the second mode;
  wherein said first list is displayed within the window and said representation is displayed within said window.

42. A data processing system to control a display, comprising:
  means for displaying, in a first mode, a slider control having a slider which can be positioned in one of a plurality of positions to select through the position of the slider alone, a corresponding one of a plurality of parameters;
  means for receiving an input to resize a window to switch from said first mode to a second mode;
  means for displaying, in said second mode, a representation of a command which when activated causes a display of a list of items corresponding to at least a subset of said plurality of parameters, wherein the list of items is not displayed when the command is not activated.

* * * * *

UNITED STATES PATENT AND TRADEMARK OFFICE
CERTIFICATE OF CORRECTION

PATENT NO. : 7,665,038 B1
APPLICATION NO. : 11/643315
DATED : February 16, 2010
INVENTOR(S) : Imran Chaudhri et al.

It is certified that error appears in the above-identified patent and that said Letters Patent is hereby corrected as shown below:

On the face page, in field (54), in "Title", in column 1, line 3, delete "PROCESS" and insert -- PROCESSING --, therefor.

On the face page, in field (74), in "Attorney, Agent or Firm", in column 2, line 1, delete "Sokololoff," and insert -- Sokoloff, --, therefor.

In column 1, line 3, delete "PROCESS" and insert -- PROCESSING --, therefor.

Signed and Sealed this
Twenty-second Day of November, 2011

David J. Kappos
*Director of the United States Patent and Trademark Office*